L. T. RICHER.
Water Can for Railroad Cars.

No. 53,748.

Patented April 3, 1866.

Witnesses:

Inventor

Leon T. Richer

UNITED STATES PATENT OFFICE.

LEON T. RICHER, OF NEW YORK, N. Y., ASSIGNOR TO HIMSELF AND ISAAC L. ALLEN.

IMPROVED WATER-CAN FOR RAILROAD-CARS.

Specification forming part of Letters Patent No. 53,748, dated April 3, 1866.

*To all whom it may concern:*

Be it known that I, LEON T. RICHER, of the city, county, and State of New York, have invented certain new and useful Improvements in Water-Cans for Railroad-Cars and for other Purposes; and I do hereby declare that the following is a full, clear, and exact description of the nature, construction, and operation of the same, reference being hereby had to the accompanying drawings, and to the letters of reference marked thereon, and which said drawings make a part of this specification.

Like letters represent and refer to like or corresponding parts of my said improvements.

Figure 1:
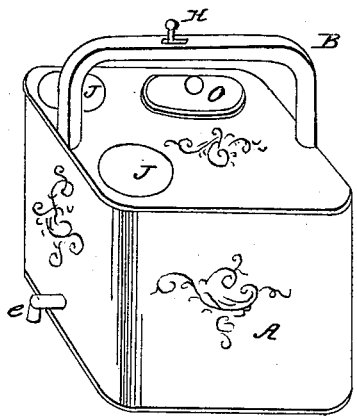
Figure 3:
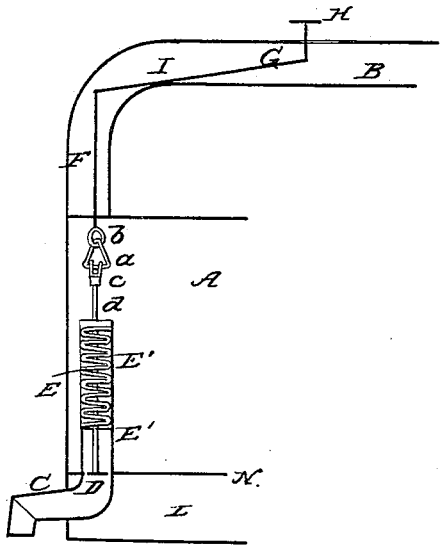
Figure 2:
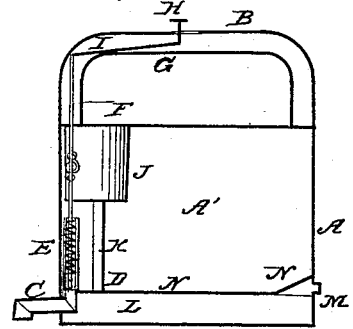

Figure 1 represents a perspective view of a water-can containing my invention and improvements, and used upon railway-cars or elsewhere, and constructed substantially as hereinafter described and set forth. Fig. 2 represents a vertical section on a line lengthwise and through the center of the same, and also through the center of the handle, by which the said water-can is suspended when in use or being carried for the supply of fresh water to passengers, and also showing the invention and improvements hereinafter described and set forth. Fig. 3 represents a section, on a somewhat enlarged scale, showing the water-valve and its connections and the mode or manner of the operation of the same, and each more fully described hereinafter.

The nature of my said invention and improvements consists in the employment of a water-can so constructed and arranged as to contain two separate distinct water-chambers—one for fresh and cool water, and one for waste, unclean, or rejected water—with recesses for the reception of the cups from which drinking-water is supplied, and into which the rejected water in said cups is poured, and thence conveyed through tubes into the water-chamber designed to receive the same, and with a water-valve operated at or near the handle or bail by which it is suspended and carried, and which, when operated for the supply of water, will easily and quickly regulate the flow or quantity to be discharged without any waste of the same, or inconvenience to passengers upon railway-cars, in the manner substantially as hereinafter described and set forth.

Having thus described the nature of my said invention and improvements, I will here proceed to describe the construction and operation of the same, in order that those skilled in the art may construct and put it into general use, which is as follows, to wit: I usually construct said water-can of tin or other suitable material, and in form or shape substantially the same as shown and represented at Fig. 1 of the drawings accompanying this specification. It may be of any size or capacity required or desired, so it may be of any form or shape deemed advisable.

A, Figs. 1 and 2, represents the tin or other metallic part of the said water-can, and is the outer case, containing both water-chambers, hereinafter described and set forth, and which said case is made water-tight by the use of solder, or by other suitable means. At the bottom of the said water-can A, I construct a lower or waste-water chamber, L, Figs. 2 and 3, and which may be of any capacity desired; but it may, of course, be much less than that which is immediately above it, and which contains the fresh, cool, or ice water to be supplied to passengers, or for other purposes, as will more fully appear hereinafter. The said chambers are permanently separated from each other by means of the partition or division plate N, Figs. 2 and 3. The said waste-water chamber L has an outlet for the full and free discharge of the waste or rejected water accumulated therein, when desirable so to do. The said outlet may be seen at M, Fig. 2. It is constructed by means of an opening or aperture through back plate or part of the said water-can, and far enough above the said division-plate N as to allow or permit the said chamber L to become filled with the water which has become unclean and unfit for use, without the same spilling or passing therefrom, except at such times as may be desirable so to do by the operator. In such case the said opening or aperture M is protected by the curving upward of the said partition or division plate N at or near such aperture, substantially as seen at N', Fig. 2, and said curve is for the express purpose of allowing the said accumulated waste water in the said lower chamber, L, to be poured out through the said aperture M, while at the same time allow or permit the full use of the entire capacity of the said chamber L.

It is manifest, however, that the aforesaid opening or aperture M might be made much lower down or toward the bottom of the lower or bottom plate of the said waste-water chamber L, and in which case the said curve N' might be dispensed with; but the said chamber L could not be entirely filled with the waste or rejected water unless a spout or tube curved upward were used, and therefore its full capacity could not be brought into successful use as well as it can or could be when constructed and arranged substantially as shown at Fig. 2 of the accompanying drawings, and as hereinbefore described and set forth.

J, Figs. 1 and 2, represents a cylindrical and downward recess or box, constructed for the purpose of receiving and containing the glass, cup, or other tumbler from which passengers receive and drink water, and also to operate as a receptacle for the waste or unclean water remaining in such cup or other vessel, for like purpose, after a passenger or other person shall have drank therefrom, by the pouring of the same into such receptacle or box J, which communicates directly with the said lower chamber, L, by means of the vertical tube K, (same figure,) so that any water poured into the said recess or receptacle J will be immediately conducted to the said lower chamber, L, constructed and arranged for that purpose, and when the said chamber becomes full, then it may be discharged therefrom, as aforesaid described, and when the person carrying the said water-can is passing from car to car if found necessary so to do. The said receptacle J may be of any diameter, depth, or capacity, and the said vertical connection K may be of any diameter required to conduct the said waste water immediately and freely to said chamber L. It will be seen that the said recess or box J has a two-fold purpose, to wit: first, to receive and to hold the glass, cup, or other vessel from which water is supplied and drank, as aforesaid; and, second, to receive the waste water being conducted away and into said lower chamber, L, substantially as aforesaid.

A', Figs. 2 and 3, is the upper chamber, and is for the purpose of receiving and containing the fresh, cool, or ice water for drinking purposes, which chamber may be of any capacity desired. The water and ice are put therein by and through the opening $o$, Fig. 1, which opening may be of any size or shape deemed best to use. The water is drawn from such chamber, when required, through the supply-tube C, Figs. 1, 2, and 3, which is constructed of any desired size or form, and so arranged in the bottom or intermediate plate, N, dividing or separating said chambers, as to permit all the water within the said chamber A' to pass therefrom while the said water-can is in a horizontal position and when desired to use said water. At the inner and upper end of the said tube C, I construct and arrange the valve D, Figs. 2 and 3, which is so made as to form a perfect water-joint when closed upon the said discharge-tube C. The diameter of the said discharge-valve will correspond to and with the diameter of the said tube C. Upon and around the upper end of said tube C, I arrange and construct the valve D, chamber E'', which contains openings at its lower end, and of sufficient capacity to allow the water to pass out through the then opened valve D into such glass, cup, or vessel used to supply and drink water from, and at the same time prevent the escape of the ice, if in small parts or pieces. Immediately above the said valve-chamber E'', Fig. 3, I construct another chamber, E', which is for the purpose of receiving and containing the coil or spiral spring E, Fig. 3, which passes around the connecting-rod $d$, and which rod, extending down and through each chamber, is united with the said valve D in some good substantial manner. The said coil or spiral spring is for the purpose of closing and firmly holding closed the said valve D when not required open for the proper discharge of water into the cup or vessel aforesaid for the supply of water to the passenger or other person, substantially as aforesaid, and the said spring may be of any size or capacity desired for the purposes intended, and may be of any suitable material.

At the upper end of the said connecting-rod $d$, I construct a joint with the connecting-link $a$ and with the joints $b$ and $c$, which link unites the rod F with the lever G, which has a fulcrum or bearing at I, Figs. 2 and 3. At the opposite or upper end of the said lever G, I construct the stem and thumb-piece H, Figs. 1, 2, and 3. By pressing down upon the said thumb-piece the said lever G is operated or borne down, by which the upper connecting-rod, F, is drawn up, and thereby drawing or moving up the lower connecting or valve rod, $d$, and thus the valve D is operated or opened so as to allow the passage of the water, which is checked or stopped whenever desired, by the removing of the pressure from the said thumb-piece H, and thereby permit the said spring E to operate upon the said valve-rod $d$ and thus close the said valve D. The said upper connecting-rod, F, and the said lever G, are so arranged within the bail or handle B as to be operated therein, which handle or bail B is constructed hollow for that purpose. The said connecting-link $a$ and joints $d$ and $c$ are for the purpose of giving a free and uninterrupted movement to the said valve-rod $d$ and upper connecting-rod, F, when operated by means of the lever G, as aforesaid. The said thumb-piece H, I usually construct at or near the center of the said bail or handle B, as seen at Figs. 1, 2, and 3, so as to be convenient to be operated by the person carrying the said water-can, and while the same is in a horizontal plane or condition, and being carried by the person operating the same, for the purposes of supplying water to passengers for drink, &c.

The aforesaid rods and levers may be constructed from any kind of material which will answer the purpose required, and each will be so adjusted and arranged as to freely operate the said discharge-valve D for the purposes aforesaid. There may be two or more of the aforesaid recesses, boxes, or receptacles J, and for the same use and purpose.

The aforesaid valve D is closely fitted into its bed or corresponding recess at the immediate upper end of the said discharge-tube C, by means of rubber or any other good and sufficient packing which will prevent the escape of any water while the valve D remains closed. The said valve is then pressed firmly into its said bed or seat by means of the said spiral or coil spring E, Fig. 3, and thereby form a water-tight joint, as and for the purpose aforesaid. By pressing upon the said thumb-piece H the said valve D is sufficiently raised as to allow the flow of water into and through the said discharge-tube C, and thence into a suitable vessel or cup to drink water from.

It is manifest that my said invention and improvements herein described and set forth, may be successfully applied to ice or water coolers for summer use in hotels, stores, shops, manufactories, or on steamboats or the same may be applied to milk-cans, coffee and tea urns, without changing the character or main features of my said invention and improvements.

Having thus described my said invention and improvements, what I claim and desire to secure by Letters Patent of the United States, is—

1. The employment of the waste or unclean water-chamber L, in combination with the vertical connecting-tube K, and receptacle or box J, each being constructed and arranged in the manner and for the purposes substantially as herein described and set forth.

2. The employment of the discharge-water valve D, in combination with the discharge-pipe C, and with the valve-chamber E'', each being constructed and arranged in the manner and for the purposes substantially as herein described and set forth.

3. The employment of the coil or spiral spring E, in combination with the valve-rod $d$, upper connecting-rod, F, lever G, thumb-piece H, and with the tube E', each being constructed and arranged in the manner and for the purposes substantially as herein described and set forth.

LEON T. RICHER.

Witnesses:
  J. B. NONES,
  A. R. JAVELLE.